US010073305B2

(12) United States Patent
Lin et al.

(10) Patent No.: US 10,073,305 B2
(45) Date of Patent: *Sep. 11, 2018

(54) LIQUID CRYSTAL DEVICE WITH FINGERPRINT IDENTIFICATION FUNCTION

(71) Applicant: KEYCORE TECHNOLOGY CORP., Zhubei, Hsinchu County (TW)

(72) Inventors: Wei-Cheng Lin, Zhubei (TW); Chien-Jen Hsiao, Zhubei (TW); Shih-Hsiu Tseng, Zhubei (TW)

(73) Assignee: KEYCORE TECHNOLOGY CORP., Zhubei, Hsinchu County (TW)

( * ) Notice: Subject to any disclaimer, the term of this patent is extended or adjusted under 35 U.S.C. 154(b) by 218 days.

This patent is subject to a terminal disclaimer.

(21) Appl. No.: 15/287,742

(22) Filed: Oct. 7, 2016

(65) Prior Publication Data

US 2018/0101714 A1 Apr. 12, 2018

(51) Int. Cl.
| | |
|---|---|
| *G06K 9/00* | (2006.01) |
| *G02F 1/1343* | (2006.01) |
| *G02F 1/1362* | (2006.01) |
| *G02F 1/1368* | (2006.01) |
| *G02F 1/1335* | (2006.01) |
| *G02F 1/1333* | (2006.01) |
| *G06F 3/041* | (2006.01) |
| *G06F 3/044* | (2006.01) |

(52) U.S. Cl.
CPC ...... *G02F 1/134309* (2013.01); *G02F 1/1368* (2013.01); *G02F 1/13338* (2013.01); *G02F 1/133528* (2013.01); *G02F 1/136286* (2013.01); *G06F 3/044* (2013.01); *G06F 3/0412* (2013.01); *G06K 9/00006* (2013.01); *G02F 2001/133302* (2013.01)

(58) Field of Classification Search
CPC .......... G02F 1/134309; G02F 1/13338; G02F 1/1368; G02F 1/136286; G02F 1/133528; G02F 2001/133302; G06F 3/047
See application file for complete search history.

(56) References Cited

U.S. PATENT DOCUMENTS

| | | | | |
|---|---|---|---|---|
| 5,446,290 A | * | 8/1995 | Fujieda | G06K 7/14 250/227.11 |
| 5,726,443 A | * | 3/1998 | Immega | G01S 17/026 250/208.1 |
| 5,907,627 A | * | 5/1999 | Borza | G06K 9/0002 250/208.1 |

(Continued)

*Primary Examiner* — John Strege
(74) *Attorney, Agent, or Firm* — Jackson IPG PLLC; Demian K. Jackson

(57) ABSTRACT

A liquid crystal device with fingerprint identification function includes an array glass substrate, a colored light filtering glass substrate, an organic light-emitting layer, a pixel display layer and a detection wire and sensation electrode layer. The organic light-emitting layer, the pixel display layer and the detection wire and sensation electrode layer are disposed between the array glass substrate and the colored light filtering glass substrate. The pixel display layer cooperates with the internal wiring and electrode structures of the detection wire and sensation electrode layer to achieve complex functions of displaying, fingerprint detection/identification and touch control.

18 Claims, 6 Drawing Sheets

(56) References Cited

U.S. PATENT DOCUMENTS

| | | | | |
|---|---|---|---|---|
| 6,950,541 B1* | 9/2005 | Setlak | G06K 9/0002 | 382/126 |
| 7,620,212 B1* | 11/2009 | Allen | G06K 9/0004 | 340/5.53 |
| 8,854,179 B2* | 10/2014 | Argudyaev | G06K 9/00053 | 340/5.52 |
| 9,582,705 B2* | 2/2017 | Du | G06K 9/00033 | |
| 9,971,456 B2* | 5/2018 | Abileah | G06F 3/0421 | |
| 2003/0179323 A1* | 9/2003 | Abileah | G02F 1/13338 | 349/24 |
| 2004/0252867 A1* | 12/2004 | Lan | G06K 9/0004 | 382/124 |
| 2010/0310137 A1* | 12/2010 | Chou | G06K 9/00013 | 382/124 |
| 2011/0122071 A1* | 5/2011 | Powell | G06F 3/0412 | 345/173 |
| 2013/0051635 A1* | 2/2013 | Wu | G06K 9/00046 | 382/124 |
| 2013/0169590 A1* | 7/2013 | Wickboldt | G02B 1/105 | 345/174 |
| 2014/0036168 A1* | 2/2014 | Ludwig | G06F 3/0412 | 349/12 |
| 2014/0218327 A1* | 8/2014 | Shi | G06F 3/041 | 345/174 |
| 2016/0086186 A1* | 3/2016 | Candelore | G06Q 20/352 | 705/44 |
| 2016/0132712 A1* | 5/2016 | Yang | G06K 9/0002 | 348/77 |
| 2016/0266695 A1* | 9/2016 | Bae | G06F 1/1643 | |
| 2017/0008122 A1* | 1/2017 | Wieland | B32B 17/06 | |
| 2017/0083745 A1* | 3/2017 | Goodelle | G06K 9/00053 | |
| 2017/0154199 A1* | 6/2017 | Li | G06K 9/0002 | |
| 2017/0185234 A1* | 6/2017 | Zhang | G06F 3/0428 | |
| 2017/0220838 A1* | 8/2017 | He | G06K 9/0004 | |
| 2017/0220842 A1* | 8/2017 | Thompson | G06F 3/0416 | |
| 2017/0220844 A1* | 8/2017 | Jones | G06K 9/0053 | |
| 2017/0235997 A1* | 8/2017 | Choi | G06K 9/00013 | 382/124 |
| 2017/0294623 A1* | 10/2017 | Gai | H01L 51/5253 | |
| 2017/0308228 A1* | 10/2017 | Benkley, III | H01L 27/323 | |
| 2018/0005005 A1* | 1/2018 | He | G06K 9/0002 | |
| 2018/0012069 A1* | 1/2018 | Chung | G06K 9/00563 | |
| 2018/0046281 A1* | 2/2018 | Pi | G06F 3/044 | |
| 2018/0081098 A1* | 3/2018 | Smith | G06K 9/0004 | |

* cited by examiner

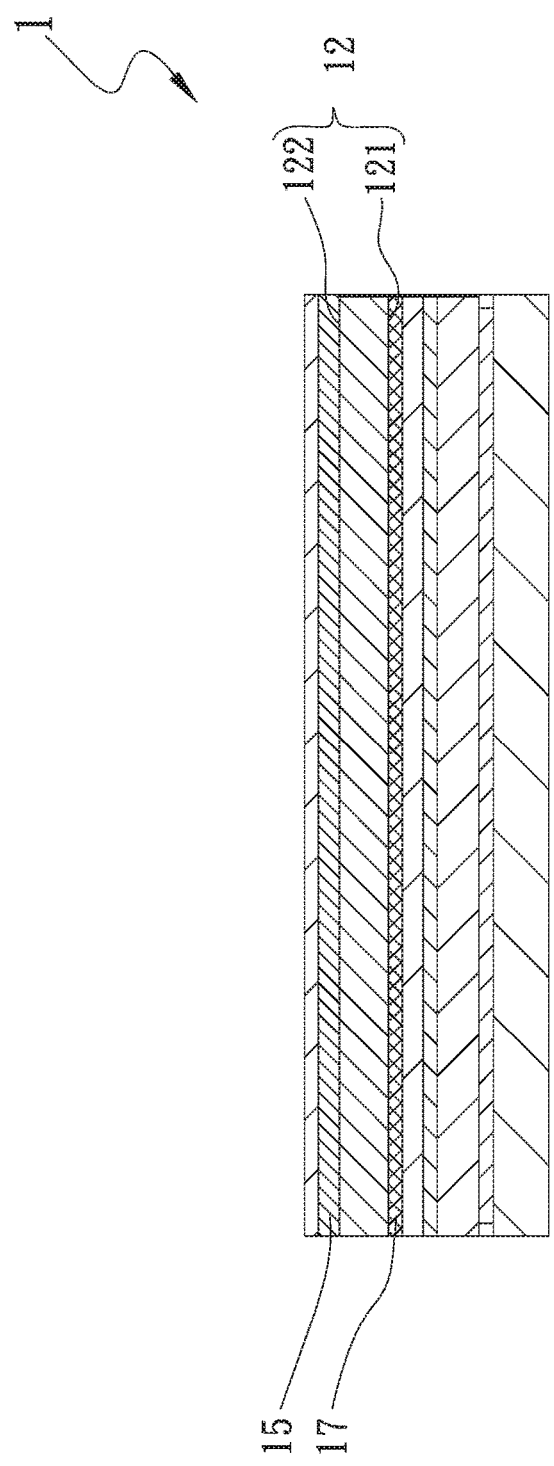

LIQUID CRYSTAL DEVICE WITH FINGERPRINT IDENTIFICATION FUNCTION

BACKGROUND OF THE INVENTION

1. Field of the Invention

The present invention relates generally to a liquid crystal device with fingerprint identification function, and more particularly to a liquid crystal device having both fingerprint identification function and touch function.

2. Description of the Related Art

In a conventional liquid crystal display with touch function, touch electrodes and wires are disposed on one side of the surface of the liquid crystal display to provide touch function for the liquid crystal display. Similarly, in order to provide fingerprint identification function, the electrodes and wiring structures for fingerprint identification are further disposed on one side of the liquid crystal display in a laminated form so as to provide fingerprint identification function for the liquid crystal display. Such design enables the liquid crystal display to have both touch function and fingerprint identification function for a user. However, at the current stage, there is a trend to thin the handheld mobile device. Therefore, in case the fingerprint identification structures and electrodes and the touch structures and electrodes are layer-by-layer disposed on the liquid crystal display in a laminated form, it will be impossible to thin the liquid crystal display as required. Moreover, the image input manners of fingerprint identification can be classified into optical scanning, thermal image sensation, capacitor image sensation, etc. With respect to optical scanning, in consideration that the device has a larger volume and consumes much power or the manufacturing process is complicated and the defect-free rate is low and the device is easy to cheat by fake fingerprint, the optical scanning can be hardly applied to the handheld mobile device. With respect to thermal image sensation, the trueness and reliability are poor so that the thermal image sensation also can hardly become the mainstream in this field. Accordingly, the capacitor image sensation has gradually become the mainstream technique of biological identification applied to mobile electronic device.

However, the distance or thickness between the fingerprint identification chip and the surface glass is also a very important design issue. When the fingerprint identification chip is spaced from the surface for detecting the fingerprint by a too large distance, the fingerprint identification chip is easy to mis-judge the fingerprint. Therefore, the conventional fingerprint identification structure can be only disposed on the surface of the liquid crystal display.

SUMMARY OF THE INVENTION

It is therefore a primary object of the present invention to provide a liquid crystal device having both fingerprint identification function and touch function.

To achieve the above and other objects, the liquid crystal device with fingerprint identification function of the present invention includes an array glass substrate, a colored light filtering glass substrate, an organic light-emitting layer, a pixel display layer, a detection wire and sensation electrode layer, a first chip and a second chip.

The array glass substrate has a first face and a second face. The first and second faces are oppositely positioned on upper and lower faces of the array glass substrate. The colored light filtering glass substrate has a third face and a fourth face. The third face corresponds to the second face. The organic light-emitting layer is disposed between the array glass substrate and the colored light filtering glass substrate. The pixel display layer is disposed on the second face of the array glass substrate. The pixel display layer has multiple scanning wires, multiple common signal wires and multiple thin-film transistors. The scanning wires and the common signal wires together define multiple display blocks. The thin-film transistors are respectively disposed in the display blocks. The thin-film transistors are selectively electrically connected to the scanning wires and the common signal wires. The detection wire and sensation electrode layer has multiple detection wires and multiple sensation electrodes. The detection wire and sensation electrode layer is overlaid on the pixel display layer in parallel to the scanning wires. The detection wires are electrically connected with the sensation electrodes. The detection wires and the common signal wires together define multiple sensation blocks. The sensation electrodes are disposed in the sensation blocks.

To achieve the above and other objects, the liquid crystal device with fingerprint identification function of the present invention includes an array glass substrate, a colored light filtering glass substrate, an organic light-emitting layer, a pixel display layer, a detection wire and sensation electrode layer, a first chip and a second chip.

The array glass substrate has a first face and a second face. The first and second faces are oppositely positioned on upper and lower faces of the array glass substrate. The colored light filtering glass substrate has a third face and a fourth face. The third face corresponds to the second face. A light shade layer is disposed on the third face. The organic light-emitting layer is disposed between the array glass substrate and the colored light filtering glass substrate. The pixel display layer is disposed on the second face of the array glass substrate. The pixel display layer has multiple scanning wires, multiple common signal wires and multiple thin-film transistors. The scanning wires and the common signal wires together define multiple display blocks. The thin-film transistors are respectively disposed in the display blocks. The thin-film transistors are selectively electrically connected to the scanning wires and the common signal wires. The detection wire and sensation electrode layer has multiple detection wires and multiple sensation electrodes. The detection wire and sensation electrode layer is disposed between the light shade layer and the organic light-emitting layer in parallel to the scanning wires. The detection wires are electrically connected with the sensation electrodes. The detection wires and the common signal wires together define multiple sensation blocks. The sensation electrodes are disposed in the sensation blocks.

To achieve the above and other objects, the liquid crystal device with fingerprint identification function of the present invention includes an array glass substrate, a colored light filtering glass substrate, an organic light-emitting layer, a pixel display layer, a detection wire and sensation electrode layer, a first chip and a second chip.

The array glass substrate has a first face and a second face. The first and second faces are oppositely positioned on upper and lower faces of the array glass substrate. The colored light filtering glass substrate has a third face and a fourth face. The third face corresponds to the second face. A light shade layer is disposed on the third face. The organic light-emitting layer is disposed between the array glass substrate and the colored light filtering glass substrate. The pixel display layer is disposed on the second face of the array glass substrate. The pixel display layer has multiple scanning wires, multiple common signal wires and multiple thin-film transistors. The scanning wires and the common signal wires together define multiple display blocks. The thin-film transistors are respectively disposed in the display blocks. The thin-film transistors are selectively electrically connected to the scanning wires and the common signal wires. The detection wire and sensation electrode layer has multiple detection wires and multiple sensation electrodes. The detection wire and sensation electrode layer is disposed on the fourth face of the colored light filtering glass substrate in parallel to the scanning wires. The detection wires are electrically connected with the sensation electrodes. The detection wires and the common signal wires together define multiple sensation blocks. The sensation electrodes are disposed in the sensation blocks.

The liquid crystal device with fingerprint identification function of the present invention is able to improve the shortcomings of the conventional liquid crystal display. In the liquid crystal device of the present invention, the detection wires and the common signal wires together define multiple sensation blocks so that the liquid crystal device has both the fingerprint identification function and touch detection function. This saves the arrangement of the touch structure layer and achieves the object of thinning the device. Also, the detection wire and sensation electrode layer cooperates with the common signal wires of the pixel display layer to provide the complex functions of fingerprint identification and touch detection. This further enhances the function of the entire liquid crystal module in comparison with the conventional liquid crystal module.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4 is a sectional assembled view of a third embodiment of the liquid crystal device with fingerprint identification function of the present invention.

DETAILED DESCRIPTION OF THE PREFERRED EMBODIMENTS

Figure 1:
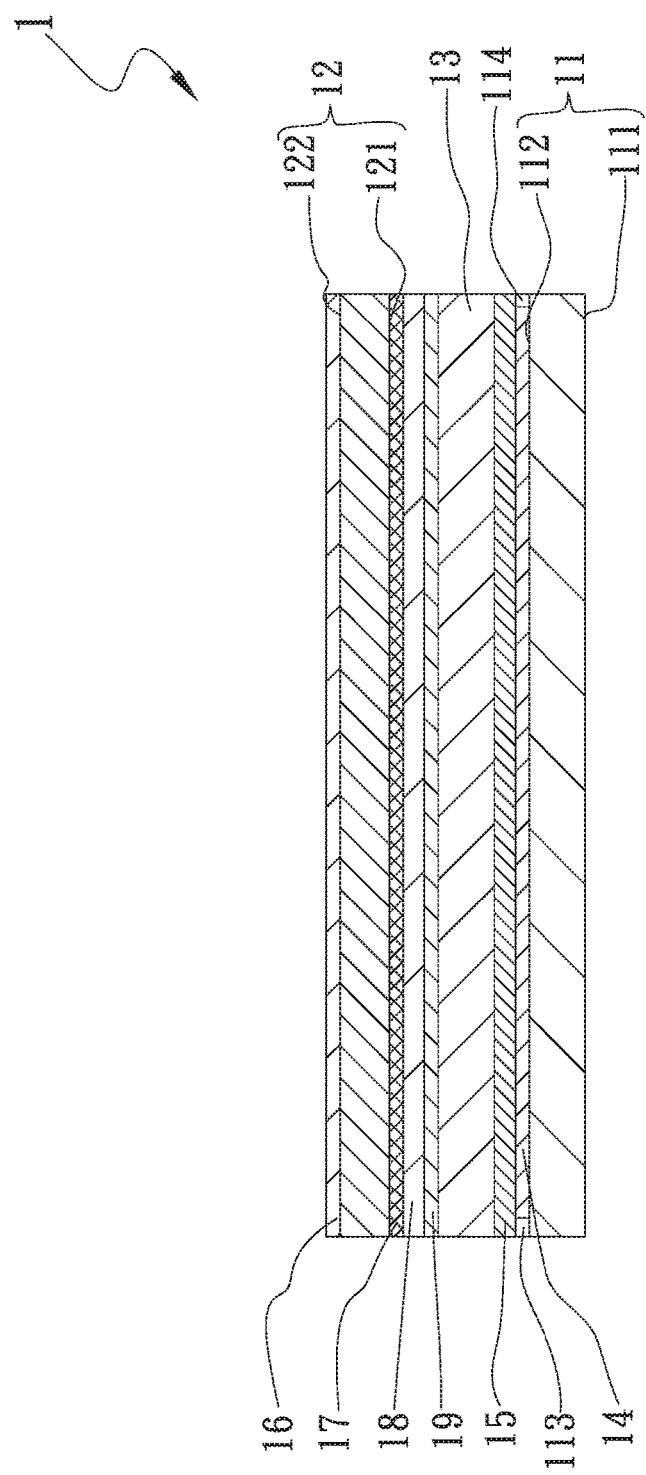
FIG. 1 is a sectional assembled view of a first embodiment of the liquid crystal device with fingerprint identification function of the present invention.
Figure 2:
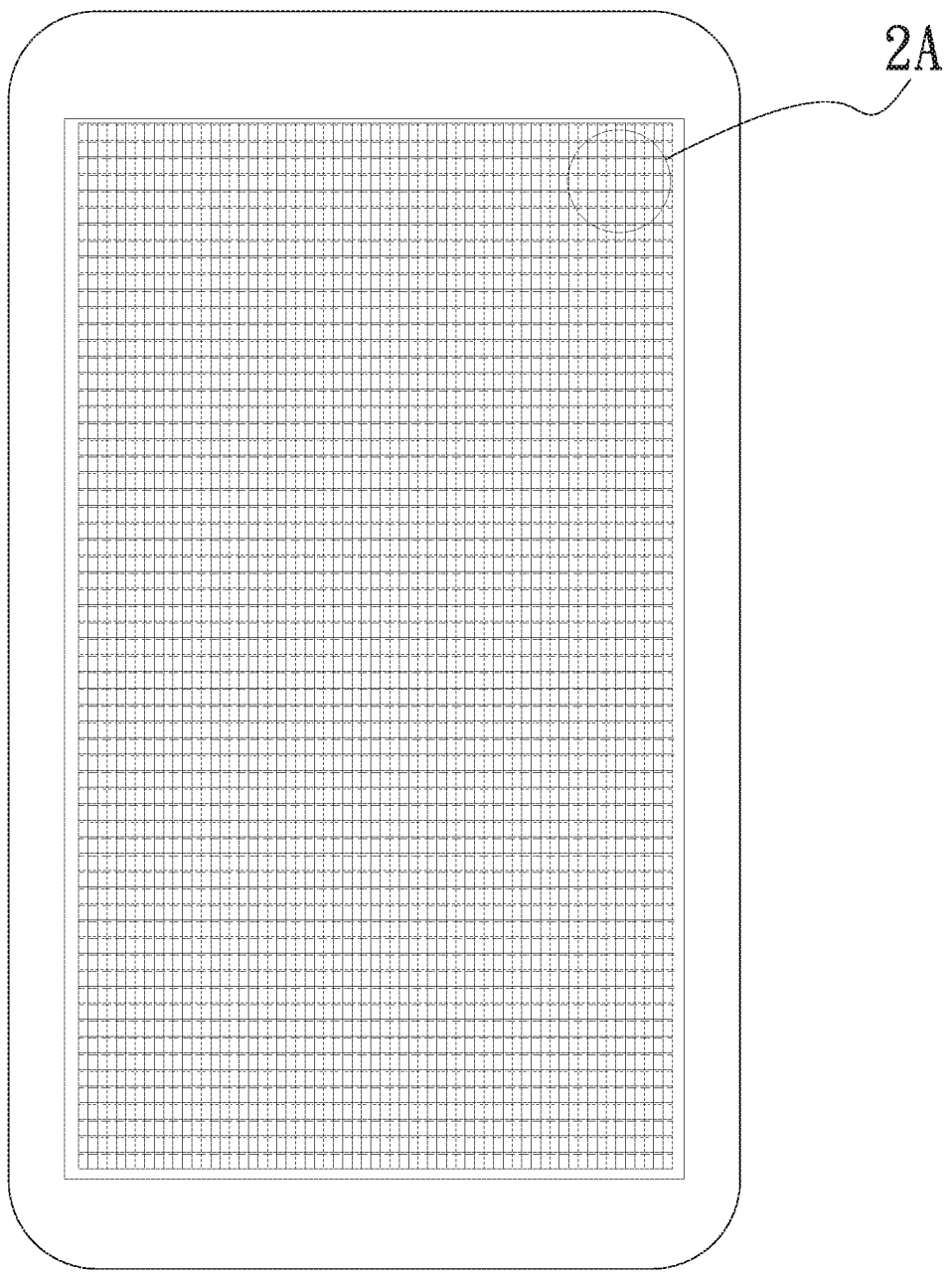
FIG. 2 is a top view of the first embodiment of the liquid crystal device with fingerprint identification function of the present invention.
Figure 2A:
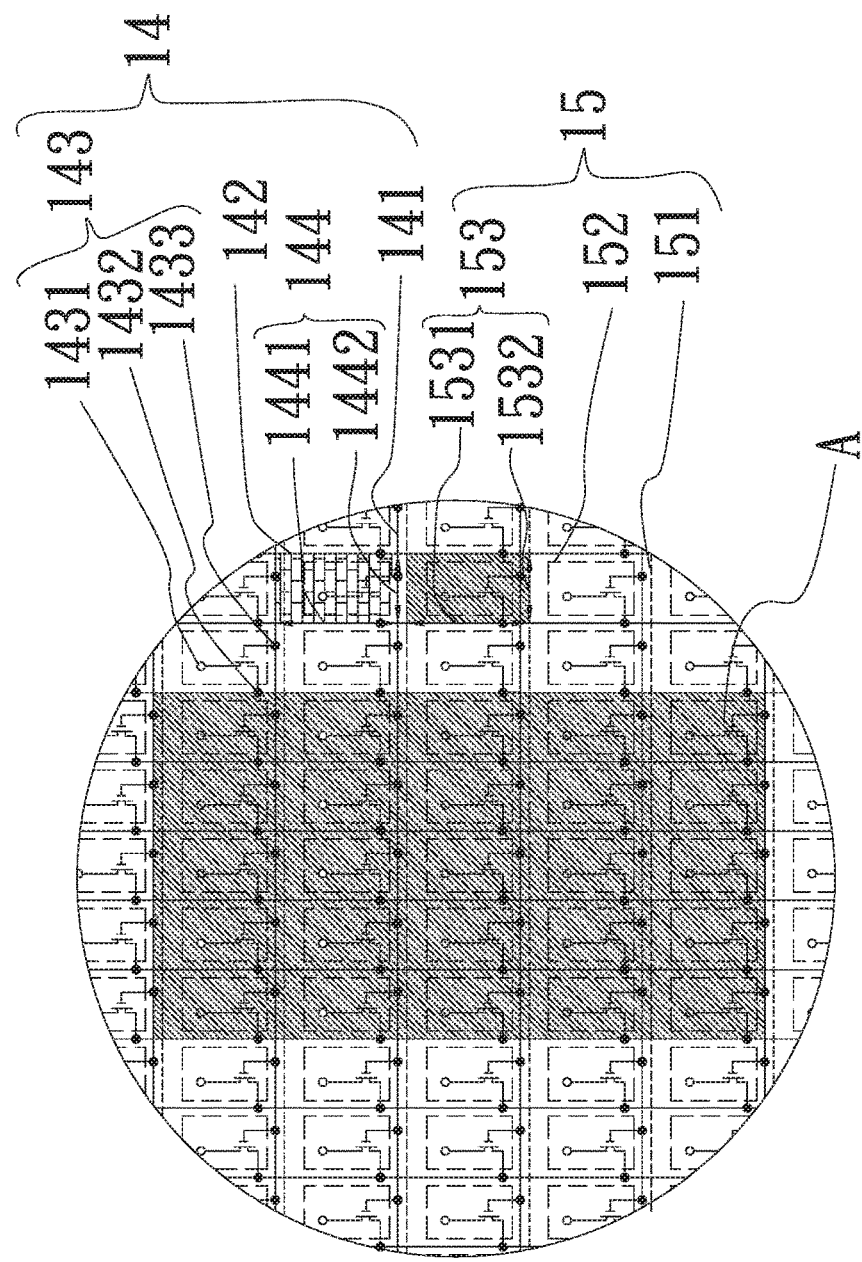
FIG. 2A is an enlarged view of circled area of FIG. 2.
Figure 2B:
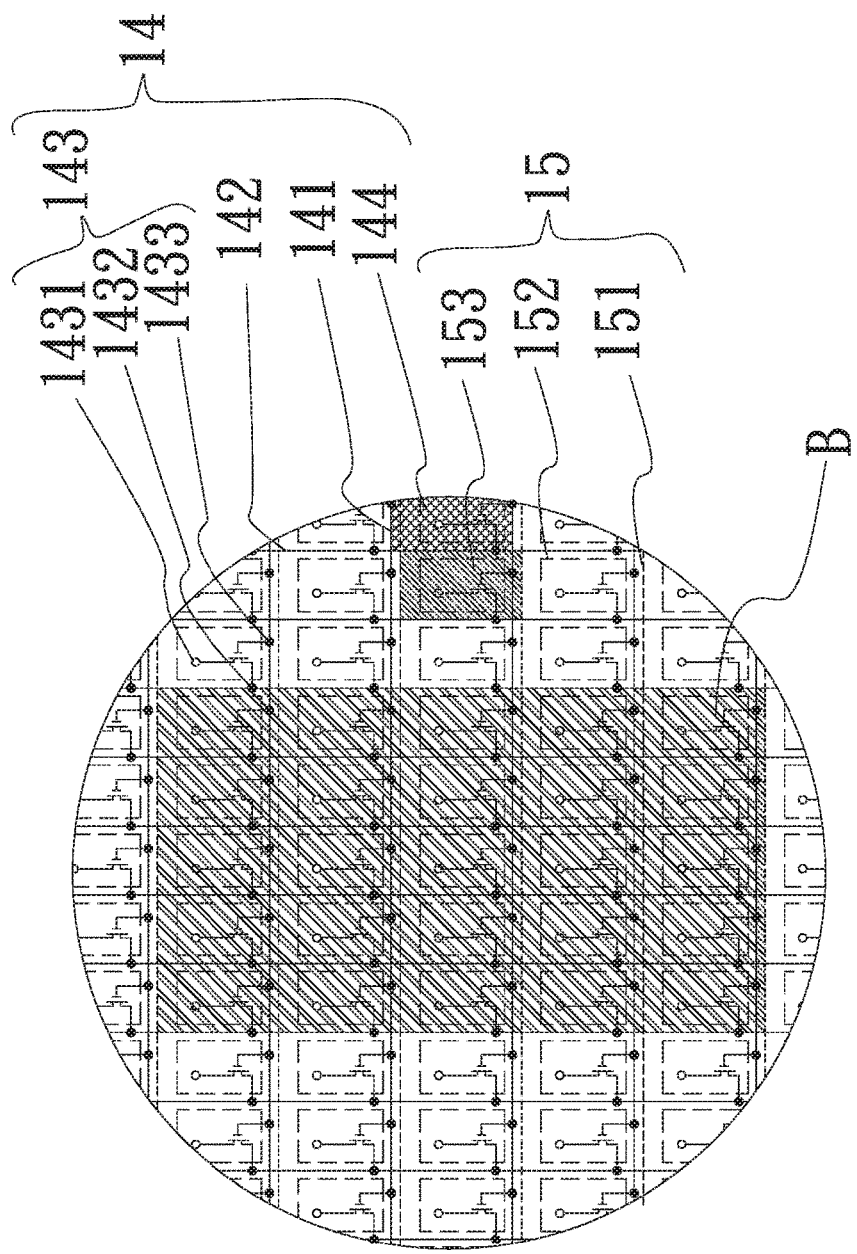
FIG. 2B is another enlarged view of circled area of FIG. 2.

Please refer to FIGS. 1, 2, 2A and 2B. FIG. 1 is a sectional assembled view of a first embodiment of the liquid crystal device with fingerprint identification function of the present invention. FIG. 2 is a top view of the first embodiment of the liquid crystal device with fingerprint identification function of the present invention. FIG. 2A is an enlarged view of circled area of FIG. 2. FIG. 2B is another enlarged view of circled area of FIG. 2. According to the first embodiment, the liquid crystal device 1 with fingerprint identification function of the present invention includes an array glass substrate 11, a colored light filtering glass substrate 12, an organic light-emitting layer 13, a pixel display layer 14, a detection wire and sensation electrode layer 15, a first chip 113 and a second chip 114.

The array glass substrate 11 has a first face 111 and a second face 112. The first and second faces 111, 112 are oppositely positioned on upper and lower faces of the array glass substrate 11.

The colored light filtering glass substrate 12 has a third face 121 and a fourth face 122. The third face 121 corresponds to the second face 112.

The organic light-emitting layer 13 is disposed between the array glass substrate 11 and the colored light filtering glass substrate 12. The pixel display layer 14 is disposed on the second face 112 of the array glass substrate 11. The pixel display layer 14 has multiple scanning wires 141, multiple common signal wires 142 and multiple thin-film transistors 143. The multiple scanning wires 141 and the multiple common signal wires 142 together define multiple display blocks 144. The thin-film transistors 143 are respectively disposed in the display blocks 144. The thin-film transistors 143 are selectively electrically connected to the scanning wires 141 and the common signal wires 142.

Each thin-film transistor 143 has a first connection point 1431, a second connection point 1432 and a third connection point 1433. The first, second and third connection points 1431, 1432, 1433 are respectively electrically connected to the scanning wires 141 and the common signal wires 142.

Each display block 144 has a first side 1441 and a first short side 1442. The first side 1441 has a length ranging from 75 μm to 120 μm. The first short side 1442 has a length ranging from 25 μm to 40 μm. The display blocks 144 can together form a 2×2 display group, a 3×3 display group, a 4×4 display group or a 5×5 display group A. In this embodiment, the display blocks 144 together form, but not limited to, a 5×5 display group A for illustration purposes.

The detection wire and sensation electrode layer 15 has multiple detection wires 151 and multiple sensation electrodes 152. The detection wire and sensation electrode layer 15 is overlaid on the pixel display layer 14 in parallel to the scanning wires 141. The sensation electrodes 152 are electrically connected to the detection wires 151 and the common signal wires 142. The detection wires 151 and the common signal wires 142 together define multiple sensation blocks 153. The sensation electrodes 152 are disposed in the sensation blocks 153.

Each sensation block 153 has a second side 1531 and a second short side 1532. The second side 1531 has a length ranging from 75 μm to 120 μm. The second short side 1532 has a length ranging from 25 μm to 40 μm. The sensation blocks 153 can together form a 2×2 sensation group, a 3×3 sensation group, a 4×4 sensation group or a 5×5 sensation group B. In this embodiment, the sensation blocks 153 together form, but not limited to, a 5×5 sensation group B for illustration purposes.

The first and second chips 113, 114 are disposed between the array glass substrate 11 and the colored light filtering glass substrate 12. The first and second chips 113, 114 are disposed on the second face 112 of the array glass substrate 11 and respectively electrically connected to the pixel display layer 14 and the detection wire and sensation electrode layer 15. The first chip 113 serves to control the pixel display layer 14. The second chip 154 serves to control the detection wire and sensation electrode layer 15.

In this embodiment, an upper polarizer 16 is further disposed on the fourth face 122 of the colored light filtering glass substrate 12. A light shade layer 17 and a colored light filtering layer 18 are laminated between the third face 121 and the organic light-emitting layer 13. A protection layer 19 is disposed on one face of the colored light filtering layer 18 in adjacency to the organic light-emitting layer 13.

Figure 3:
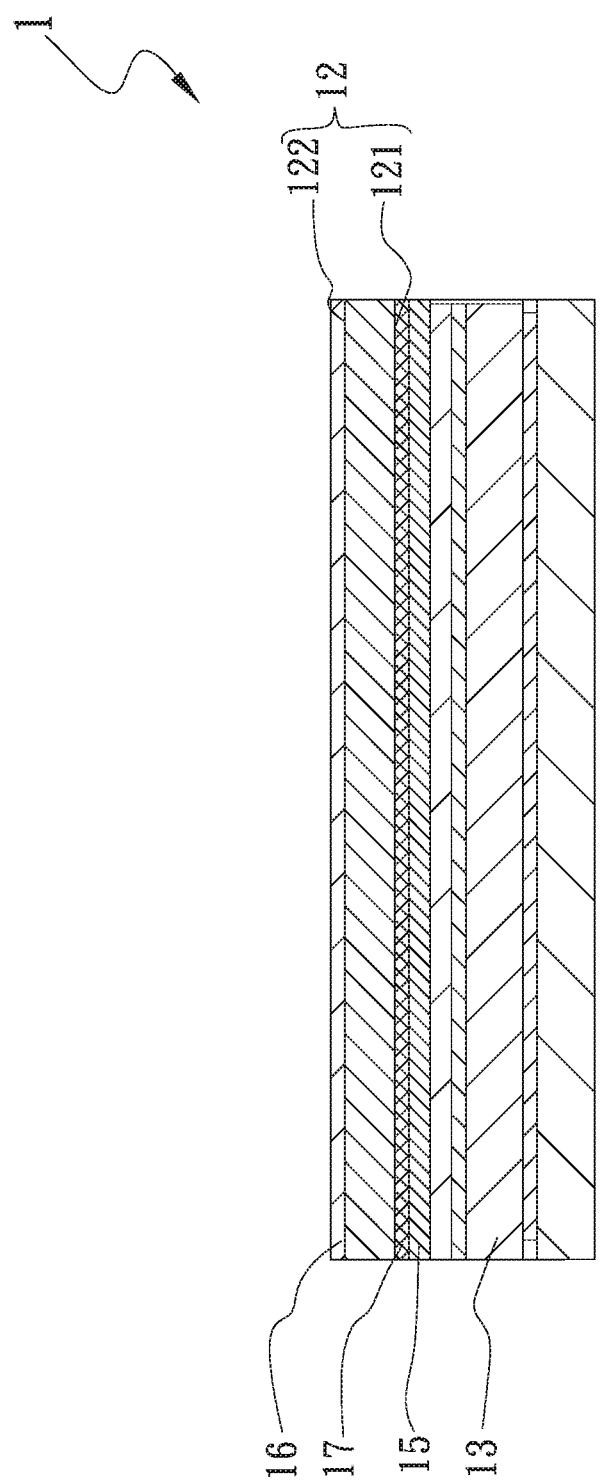
FIG. 3 is a sectional assembled view of a second embodiment of the liquid crystal device with fingerprint identification function of the present invention.

Please now refer to FIG. 3, which is a sectional assembled view of a second embodiment of the liquid crystal device with fingerprint identification function of the present invention. The second embodiment is partially identical to the first embodiment in structure and technical characteristic and thus will not be repeatedly described hereinafter. The second embodiment is different from the first embodiment in that a light shade layer 17 is disposed on the third face 121 of the colored light filtering glass substrate 12 and the detection wire and sensation electrode layer 15 is disposed between the light shade layer 17 and the organic light-emitting layer 13.

Please now refer to FIG. 4, which is a sectional assembled view of a third embodiment of the liquid crystal device with fingerprint identification function of the present invention. The third embodiment is partially identical to the second embodiment in structure and technical characteristic and thus will not be repeatedly described hereinafter. The third embodiment is different from the second embodiment in that a light shade layer 17 is disposed on the third face 121 of the colored light filtering glass substrate 12.

The third embodiment is most different from the first embodiment in that the detection wire and sensation electrode layer 15 is disposed on the fourth face 122 of the colored light filtering glass substrate 12.

Please refer to FIGS. 1 to 4 again. The first, second and third embodiments of the present invention all disclose structural and technical characteristics of the liquid crystal device with both fingerprint identification function and touch function. In the liquid crystal device, the scanning wires 141 and the common signal wires 142 of the pixel display layer 14 together define multiple display blocks 144 for displaying the image. When the scanning wires 141 perform scanning process, the thin-film transistors 143 in the display blocks 144 serve to electrically connect the scanning wires 141 with the common signal wires 142.

In the present invention, the detection wire and sensation electrode layer 15 mainly for identifying the fingerprints is laminated with the pixel display layer 14. In addition, the detection wires 151 are adjacent to and parallel to the scanning wires 141. The detection wire and sensation electrode layer 15 and the pixel display layer 14 commonly use the common signal wires 142. Therefore, the longitudinal detection wires can be omitted. This not only reduces the total thickness, but also saves the manufacturing cost.

In the present invention, the pixel display layer 14 and the detection wire and sensation electrode layer 15 commonly use the common signal wires 142. Therefore, the use of the common signal wires 142 can be switched at different time. That is, the pixel display layer 14 first uses the common signal wires 142 for scanning and displaying. After the pixel display layer 14 displays the pixels, the common signal wires 142 are switched to the detection wire and sensation electrode layer 15 for the detection wire and sensation electrode layer 15 to identify fingerprints. When the pixel display layer 14 performs scanning and displaying, the horizontally arranged scanning wires 141 are sequentially driven and the longitudinally arranged common signal wires 142 are also sequentially driven. After the execution of the scanning wires 141 is completed, the common signal wires 142 are switched to the detection wire and sensation electrode layer 15 for the detection wire and sensation electrode layer 15 to execute fingerprint detection and identification works. The detection wires 151 of the detection wire and sensation electrode layer 15 are horizontally arranged in adjacency to the scanning wires 141. Therefore, when switched to the detection wires 151 to perform sensation work, the detection wires 151 are sequentially activated and the common signal wires 142 are also sequentially activated to perform the work.

The aforesaid layers of structures of the present invention are electrically connected to each other. The rest layers of structures are not connected to each other and insulated from each other by means of wiring or arranging insulation layers between the rest layers of structures.

The detection wire and sensation electrode layer 15 performs the detection work mainly via the sensation blocks 153 together defined by the common signal wires 142. In the aforesaid embodiments of the present invention, it is mentioned that the sensation blocks 153 can together form a 2×2 sensation group, a 3×3 sensation group, a 4×4 sensation group, a 5×5 sensation group B or a larger array of sensation group. In this embodiment, the sensation blocks 153 together form a 5×5 sensation group B for illustration purposes. The sensation group B serves as a basis for judging whether the fingerprint detection and identification work is performed or the touch sensation work is performed. In the case that the detection range exceeds the range of the 5×5 sensation group B, it is judged that this is for fingerprint identification and a fingerprint identification work is performed. In the case that the detection range deceeds the range of the 5×5 sensation group B, the coordinate of the central value is taken to judge that this is for touch point detection. The area of the sensation group is about 46875 to 120000 $\mu m^2$.

The aforesaid judgment of the detection range of the sensation group B and the switch of the common signal wires 142 are mainly controlled and judged by a CPU or software (not shown) electrically connected thereto. The CPU also drives the first and second chips 113, 114 to control the pixel display layer 14 and the detection wire and sensation electrode layer 15. The present invention mainly discloses a complex structure and technique having both fingerprint identification function and touch detection function. The CPU and software for controlling and judging pertain to prior art and thus will not be further described hereinafter.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A liquid crystal device with fingerprint identification function, comprising:

an array glass substrate having a first face and a second face, the first and second faces being oppositely positioned on upper and lower faces of the array glass substrate;

a colored light filtering glass substrate having a third face and a fourth face, the third face corresponding to the second face;

an organic light-emitting layer disposed between the array glass substrate and the colored light filtering glass substrate;

a pixel display layer disposed on the second face of the array glass substrate, the pixel display layer having multiple scanning wires, multiple common signal wires and multiple thin-film transistors, the scanning wires and the common signal wires together defining multiple display blocks, the thin-film transistors being respectively disposed in the display blocks, the thin-film transistors being selectively electrically connected to the scanning wires and the common signal wires;

a detection wire and sensation electrode layer having multiple detection wires and multiple sensation electrodes, the detection wire and sensation electrode layer being overlaid on the pixel display layer in parallel to the scanning wires, the sensation electrodes being electrically connected to the detection wires and the common signal wires, the detection wires and the common signal wires together defining multiple sensation blocks, the sensation electrodes being disposed in the sensation blocks;

a first chip disposed on the second face of the array glass substrate and electrically connected to the pixel display layer; and a second chip disposed on the second face of the array glass substrate and electrically connected to the detection wire and sensation electrode layer.

2. The liquid crystal device with fingerprint identification function as claimed in claim 1, wherein each display block has a first side and a first short side, the first side having a length ranging from 75 µm to 120 µm, the first short side having a length ranging from 25 µm to 40 µm.

3. The liquid crystal device with fingerprint identification function as claimed in claim 1, wherein each thin-film transistor has a first connection point, a second connection point and a third connection point, the first, second and third connection points being respectively electrically connected to the scanning wires and the common signal wires.

4. The liquid crystal device with fingerprint identification function as claimed in claim 1, wherein each sensation block has a second side and a second short side, the second side having a length ranging from 75 µm to 120 µm, the second short side having a length ranging from 25 µm to 40 µm.

5. The liquid crystal device with fingerprint identification function as claimed in claim 1, wherein an upper polarizer is further disposed on the fourth face of the colored light filtering glass substrate, a light shade layer and a colored light filtering layer being laminated between the third face and the organic light-emitting layer, a protection layer being disposed on one face of the colored light filtering layer in adjacency to the organic light-emitting layer.

6. The liquid crystal device with fingerprint identification function as claimed in claim 1, wherein the first chip serves to control the pixel display layer, while the second chip serves to control the detection wire and sensation electrode layer.

7. A liquid crystal device with fingerprint identification function, comprising:

an array glass substrate having a first face and a second face, the first and second faces being oppositely positioned on upper and lower faces of the array glass substrate;

a colored light filtering glass substrate having a third face and a fourth face, the third face corresponding to the second face, a light shade layer being disposed on the third face;

an organic light-emitting layer disposed between the array glass substrate and the colored light filtering glass substrate;

a pixel display layer disposed on the second face of the array glass substrate, the pixel display layer having multiple scanning wires, multiple common signal wires and multiple thin-film transistors, the scanning wires and the common signal wires together defining multiple display blocks, the thin-film transistors being respectively disposed in the display blocks, the thin-film transistors being selectively electrically connected to the scanning wires and the common signal wires;

a detection wire and sensation electrode layer having multiple detection wires and multiple sensation electrodes, the detection wire and sensation electrode layer being disposed between the light shade layer and the organic light-emitting layer in parallel to the scanning wires, the sensation electrodes being electrically connected to the detection wires and the common signal wires, the detection wires and the common signal wires together defining multiple sensation blocks, the sensation electrodes being disposed in the sensation blocks;

a first chip disposed on the second face of the array glass substrate and electrically connected to the pixel display layer; and a second chip disposed on the second face of the array glass substrate and electrically connected to the detection wire and sensation electrode layer.

8. The liquid crystal device with fingerprint identification function as claimed in claim 7, wherein each display block has a first side and a first short side, the first side having a length ranging from 75 µm to 120 µm, the first short side having a length ranging from 25 µm to 40 µm.

9. The liquid crystal device with fingerprint identification function as claimed in claim 7, wherein each thin-film transistor has a first connection point, a second connection point and a third connection point, the first, second and third connection points being respectively electrically connected to the scanning wires and the common signal wires.

10. The liquid crystal device with fingerprint identification function as claimed in claim 7, wherein each sensation block has a second side and a second short side, the second side having a length ranging from 75 µm to 120 µm, the second short side having a length ranging from 25 µm to 40 µm.

11. The liquid crystal device with fingerprint identification function as claimed in claim 7, wherein an upper polarizer is further disposed on the fourth face of the colored light filtering glass substrate, a colored light filtering layer being disposed between the detection wire and sensation electrode layer and the organic light-emitting layer, a protection layer being disposed on one face of the colored light filtering layer in adjacency to the organic light-emitting layer.

12. The liquid crystal device with fingerprint identification function as claimed in claim 7, wherein the first chip serves to control the pixel display layer, while the second chip serves to control the detection wire and sensation electrode layer.

13. A liquid crystal device with fingerprint identification function, comprising:

an array glass substrate having a first face and a second face, the first and second faces being oppositely positioned on upper and lower faces of the array glass substrate;

a colored light filtering glass substrate having a third face and a fourth face, the third face corresponding to the second face, a light shade layer being disposed on the third face;

an organic light-emitting layer disposed between the array glass substrate and the colored light filtering glass substrate;

a pixel display layer disposed on the second face of the array glass substrate, the pixel display layer having multiple scanning wires, multiple common signal wires and multiple thin-film transistors, the scanning wires and the common signal wires together defining multiple display blocks, the thin-film transistors being respectively disposed in the display blocks, the thin-film transistors being selectively electrically connected to the scanning wires and the common signal wires;

a detection wire and sensation electrode layer having multiple detection wires and multiple sensation electrodes, the detection wire and sensation electrode layer being disposed on the fourth face of the colored light filtering glass substrate in parallel to the scanning wires, the sensation electrodes being electrically connected to the detection wires and the common signal wires, the detection wires and the common signal wires together defining multiple sensation blocks, the sensation electrodes being disposed in the sensation blocks;

a first chip disposed on the second face of the array glass substrate and electrically connected to the pixel display layer; and a second chip disposed on the second face of the array glass substrate and electrically connected to the detection wire and sensation electrode layer.

14. The liquid crystal device with fingerprint identification function as claimed in claim 13, wherein each display block has a first side and a first short side, the first side having a length ranging from 75 μm to 120 μm, the first short side having a length ranging from 25 μm to 40 μm.

15. The liquid crystal device with fingerprint identification function as claimed in claim 13, wherein each thin-film transistor has a first connection point, a second connection point and a third connection point, the first, second and third connection points being respectively electrically connected to the scanning wires and the common signal wires.

16. The liquid crystal device with fingerprint identification function as claimed in claim 13, wherein each sensation block has a second side and a second short side, the second side having a length ranging from 75 μm to 120 μm, the second short side having a length ranging from 25 μm to 40 μm.

17. The liquid crystal device with fingerprint identification function as claimed in claim 13, wherein an upper polarizer is further disposed on the detection wire and sensation electrode layer, a light shade layer being disposed between the colored light filtering glass substrate and the organic light-emitting layer, a colored light filtering layer being disposed between the light shade layer and the organic light-emitting layer, a protection layer being disposed on one face of the colored light filtering layer in adjacency to the organic light-emitting layer.

18. The liquid crystal device with fingerprint identification function as claimed in claim 13, wherein the first chip serves to control the pixel display layer, while the second chip serves to control the detection wire and sensation electrode layer.

* * * * *